United States Patent Office 3,335,214
Patented Aug. 8, 1967

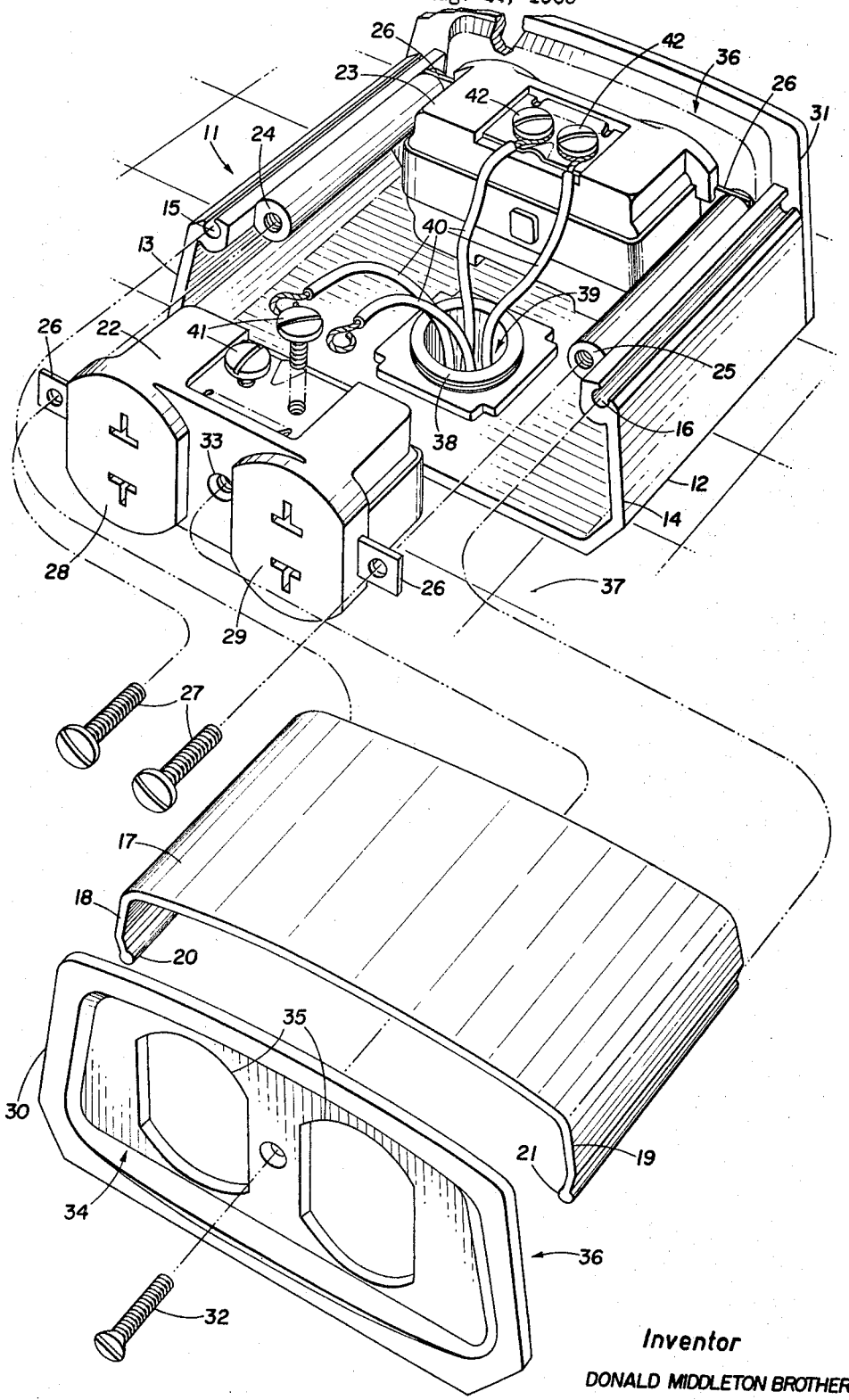

3,335,214
ELECTRICAL OUTLET
Donald Middleton Brotherhood, 122 Brook St.,
Thornhill, Ontario, Canada
Filed Aug. 13, 1965, Ser. No. 479,453
8 Claims. (Cl. 174—48)

This invention relates to improvements in electrical outlets for use with floor mountings and the like.

It is conventional practice especially in office buildings and other large structures, to provide wiring conduits embedded in the floor in a predetermined pattern extending over each floor area, whereby electrical convenience outlets may be provided as required. It is also conventional practice to utilize housings for such electrical outlets which are molded from metallic compounds and with each formed in substantially one piece construction. It is also conventional practice to provide various types of die cast parts in the manufacture of such housings whereby the required configuration for the housing may be secured with a minimum amount of tooling or reworking of the housing parts.

A number of disadvantages are associated with prior methods of forming such electrical outlets, one of which is the necessity for providing various fastening means for securing the individual portions of the housing together. Many such types of conventional electrical outlets utilize housings manufactured with a plurality of different sections which are secured together by means of a number of screws, which multiplicity of parts renders it difficult to open the housing for the inspection of wiring according to local electrical standards.

Accordingly, it is an object of the present invention to provide an electrical outlet which employs a housing therefor which may be conveniently opened for inspection and servicing of the electrical components thereof.

It is a further object of this invention to provide an electrical outlet which may be fabricated by the use of conventional manufacturing techniques which will enable the outlet to be manufactured at a reduced cost.

These and other objects and features of the invention will become apparent from the following detailed description and accompanying drawings in which like numerals refer to like parts.

In the drawings:

The figure is an exploded perspective view of a presently preferred embodiment of the invention.

With reference to the figure an electrical outlet indicated generally as 11 is illustrated and comprises a base housing 12 provided with a pair of substantially vertical, opposed side walls 13 and 14 secured thereto. The upper edge of each wall 13 and 14 is provided with a lengthwise slot 15 and 16 respectively, said slots running substantially the length of both walls 13 and 14.

A housing cover 17 is provided with downwardly turned opposite ends 18 and 19 and beads 20 and 21 formed on walls 18 and 19 respectively, extending substantially the length thereof and faced inwardly of said walls, whereby the beads 20 and 21 match in slideable engagement with slots 15 and 16, thereby to removeably secure housing cover 17 to base housing 12. In the present embodiment it is preferable to form the bead on the housing cover 17 and the slots in the base housing 12, however, it will be understood that instead one or more beads may be provided on the side walls 13 and 14 to match with suitable slots formed into cover 17. It should also be understood that the beads and thus the slots may be formed facing in other directions than that shown in the drawings, i.e., facing outwardly instead of inwardly as shown.

It is also preferable to form both housing members 12 and 17 from extruded section since the constant cross section of each member lends itself to this method of manufacture. It will be further understood however that other means may be employed for forming the members 12 and 17, such as, for instance, injection molding and that the beads 20, 21 may be replaced with other projections suitable for engagement with slots 15 and 16.

A pair of electrical connecting elements 22 and 23 are secured to the bosses 24 and 25 located on the inner side of walls 13 and 14 respectively, whereby elements 22 and 23 are supported across the open ends of the housing formed by base housing 12 and housing cover 17 therethogether. The elements 22 and 23 as illustrated are provided with side ears 26 and 27 and plug in faces 28 and 29 this being a readily available, conventional type of electrical element. It will be understood however that other types and styles of electrical elements may be used in conjunction with the electrical outlet 11.

A pair of end plates 30 and 31 are adapted to be secured to the open ends of said housing a screw 32 being provided whereby the respective plates 30 and 31 may be secured to element 22 or 23 by the threaded hole 33 as provided. Each plate 30 and 31 is provided with a recessed face as indicated at 34 which defines cutouts 35 to match the faces 28 and 29 of element 22 or 23 respectively. Each plate 30, 31 is also provided with a recessed rim as indicated at 36 which matches the periphery of the open ends formed by the housing, whereby lateral or side movement of plates 30, 31 is prevented.

In use the electrical outlet 11 may be supported above a floor 37 on a conduit 38, said conduit being in communication with the underfloor raceway 39. Electrical wires 40 can be brought up through conduit 38 and conveniently secured to the screws 41 and 42 on the electrical elements 22 and 23 respectively. Upon completion of assembly of the wires to the elements housing cover 17 may be slid into place whereafter end plates 30, 31 may be secured to the respective elements. Upon it being desired to inspect elements 22 or 23 for replacement or merely for inspecting the condition thereof only one end plate need be removed the cover 17 then being removed from this one side. This simple removal feature is of great value in practice since it enables the inspection of the electrical connections with a minimum amount of effort on the part of an inspector. In addition, the simple removal procedure is of importance to a repairman wishing to replace one or both of the elements 22 and 23 or for addition of wiring attachments to element 22 or 23.

It is also to be observed that in the embodiment as illustrated in the drawing the elements 22 and 23 are installed back to back in a mutually sloping configuration. In addition the ends of members 12 and 13 are similarly sloped whereby the end plates 30 and 31 are supported in similar sloping configuration. The slight sloping position of the elements 22 and 23 enables a person to more easily connect and disconnect electrical plugs therein, particularly when the outlet 11 is secured onto a floor. It will be understood however that the ends of the outlet 11 may also be provided vertically if so desired.

It will be further understood that although a specific embodiment of the invention has herein been described and illustrated, the invention also contemplates such variation in design and manufacture as may fall within the scope of the subjoined claims.

What I claim is:

1. An electrical outlet for above surface mounting of a pair of electrical elements supported in back to back relationship, faces pointing outwardly, and comprising: a base housing having a pair of substantially upright, opposed side walls; a bead formed along at least a part of each said walls; a housing cover having a pair of opposite ends each defining a slot along the length thereof, to match in slidable engagement said beads, whereby said housing cover is releasably secured to said base housing to define a housing having two open ends; means on each end of said base housing to support said elements across said open ends; and, a pair of end plates to match said open ends, each said plate defining cutouts for access to said elements, said plates being secured to said elements, thereby to cover said open ends.

2. An electrical outlet for above surface mounting of a pair of electrical elements supported in back to back relationship, faces pointing outwardly, and comprising: a base housing having a pair of substantially upright, opposed side walls; a bead formed along at least a part of each said walls; a housing cover having a pair of of opposite ends each defining a slot along the length thereof, to match in slidable engagement said beads, whereby said housing cover is releasably secured to said base housing to define a housing having two open ends; means on each end of said base housing to support said elements across said open ends; a pair of end plates to match said open ends, each said plate defining cutouts for access to said elements, said plates being secured to said elements, thereby to cover said open ends; and, a recessed rim about each said end plate, to match the periphery of said open ends, thereby to prevent side movement of said plates.

3. An electrical outlet for above surface mounting of a pair of electrical elements supported in back to back relationship, faces pointing outwardly, and comprising: a base housing having a pair of upright, opposed side walls, each said wall defining a lengthwise slot along the outside surface thereof; a housing cover having a pair of opposite ends formed downwardly; a bead formed inwardly along the length of each said opposite ends, thereby to match in slidable engagement said slots, whereby said housing cover is releasably secured to said base housing to define a housing having two sloping open ends; means on each end of said base housing to support said elements across said open ends; and, a pair of end plates to match said open ends, each of said plate defining cutouts for access to said elements, said plates being secured to said elements, thereby to cover said open ends.

4. An electrical outlet for above surface mounting of a pair of electrical elements supported in back to back relationship, faces pointing outwardly, and comprising: a base housing having a pair of upright, opposed side walls, each said wall defining a lengthwise slot along the outside surface thereof; a housing cover having a pair of opposite ends formed downwardly; a bead formed inwardly along the length of each said opposite ends, thereby to match in slidable engagement said slots whereby said housing cover is releasably secured to said base housing to define a housing having two sloping open ends; means on each end of said base housing to support said elements across said open ends; and, a pair of end plates covering each said open end, each said plate having a recessed face defining a cutout to match said face of said element, each said plate being releasably secured to each respective element.

5. An electrical outlet for above surface mounting and comprising: a base housing having a pair of substantially upright, opposed side walls; a bead formed along at least a part of each said walls; a housing cover having a pair of opposite ends each defining a slot along the length thereof, to match in slidable engagement said beads, whereby said housing cover is releasably secured to said base housing to define a housing having two open ends; a pair of electrical connecting elements, each including a face and side connecting ears, said elements being releasably secured across each said open ends; and, a pair of end plates to match said open ends, each said plate defining cutouts for access to said elements, said plates being secured to said elements, thereby to cover said open ends.

6. An electrical outlet for above surface mounting and comprising: a base housing having a pair of upright, opposed side walls, each said wall defining a lengthwise slot along the outside surface thereof; a housing cover having a pair of opposite ends formed downwardly; a bead formed inwardly along the length of each said opposite ends, thereby to match in slidable engagement said slots, whereby said housing cover is releasably secured to said base housing to define a housing having two sloping open ends; a pair of electrical connecting elements, each including a face and side connecting ears, said elements being releasably secured across each said open ends; and, a pair of end plates covering each said open end, each said plate having a recessed face defining a cutout to match said face of said element, each said plate being releasably secured to each respective element.

7. An electrical outlet for above surface mounting and comprising: a base housing of uniform cross section and having a pair of substantially upright opposed side walls, each said wall defining a lengthwise slot along the upper, outside edge thereof; a housing cover of uniform cross section and having a pair of opposite ends formed downwardly; a bead formed inwardly along the length of each said opposite ends, thereby to match in slidable engagement said slots, whereby said housing cover is releasably secured to said base housing to define a housing having two sloping open ends; a pair of electrical connecting elements, each including a face and side connecting ears, said elements being releasably secured across each said open ends; and, a pair of end plates covering each said open end, each said plate having a recessed face defining a cutout to match said face of said element, each said plate being releasably secured to each respective element.

8. An electrical outlet for above surface mounting and comprising: a base housing of uniform cross section and having a pair of substantially upright opposed side walls, each said wall defining a lengthwise slot along the upper outside edge thereof; a housing cover of uniform cross section and having a pair of opposite ends formed downwardly; a bead formed inwardly along the length of each said opposite ends, thereby to match in slidable engagement said slots, whereby said housing cover is releasably secured to said base housing to define a housing having two sloping open ends; a pair of electrical connecting elements, each including a face and side connecting ears, said elements being releasable secured across each said open ends; a pair of end plates covering each said open end, each said plate having a recessed face defining a cutout to match said face of said element, each said plate being releasably secured to each respective element; and, a recessed rim about each said end plate, to match the periphery of said open ends, thereby to prevent side movement of said plates.

References Cited

UNITED STATES PATENTS 3,083,857   4/1963   Clark _____ 220—3.8 X

FOREIGN PATENTS 228,299   7/1963   Austria.

LEWIS H. MYERS, Primary Examiner.

H. W. COLLINS, Assistant Examiner.